(12) United States Patent
Quere

(10) Patent No.: US 8,188,633 B2
(45) Date of Patent: May 29, 2012

(54) INTEGRATED COMPOSITE ELECTROMECHANICAL MACHINES

(76) Inventor: Eric Stephane Quere, Los Altos, CA (US)

(\*) Notice: Subject to any disclaimer, the term of this patent is extended or adjusted under 35 U.S.C. 154(b) by 88 days.

(21) Appl. No.: 12/348,321

(22) Filed: Jan. 5, 2009

(65) Prior Publication Data
US 2010/0171451 A1    Jul. 8, 2010

(51) Int. Cl.
*H02K 7/20* (2006.01)
(52) U.S. Cl. ............. 310/268; 310/266; 310/112
(58) Field of Classification Search .......... 310/266, 310/268, 112–114
See application file for complete search history.

(56) References Cited

U.S. PATENT DOCUMENTS

| | | | | |
|---|---|---|---|---|
| 3,134,037 A | * | 5/1964 | Upton | 310/90 |
| 3,567,978 A | * | 3/1971 | Parker | 310/124 |
| 4,187,441 A | * | 2/1980 | Oney | 310/112 |
| 4,571,528 A | * | 2/1986 | McGee et al. | 318/400.41 |
| 5,258,676 A | * | 11/1993 | Reinhardt et al. | 310/112 |
| 5,495,131 A | * | 2/1996 | Goldie et al. | 310/12.15 |
| 5,907,199 A | * | 5/1999 | Miller | 310/12.14 |
| 6,147,415 A | * | 11/2000 | Fukada | 290/55 |
| 6,762,526 B2 | * | 7/2004 | Isozaki et al. | 310/112 |
| 6,930,422 B2 | * | 8/2005 | Rose | 310/156.32 |
| 7,821,169 B2 | * | 10/2010 | Okazaki et al. | 310/156.36 |

FOREIGN PATENT DOCUMENTS
WO   WO2006/068042    *   6/2006
\* cited by examiner

*Primary Examiner* — Dang Le
(74) *Attorney, Agent, or Firm* — Tue Nguyen

(57) ABSTRACT

Embodiments of the present invention include a composite electromechanical machine which can operate as a motor or a generator (including dynamo or alternator). In an aspect, the present composite electromechanical machine comprises at least double-sided magnetic planes (e.g., rotor or stator) disposed on both sides of a central frames. Other embodiments can also be included.

20 Claims, 19 Drawing Sheets

US 8,188,633 B2

INTEGRATED COMPOSITE ELECTROMECHANICAL MACHINES

The present invention is related to application Ser. No. 12/210,169, filing date Sep. 12, 2008, entitled "Composite electromechanical machines with gear mechanism", and to application Ser. No. 12/210,171, filing date Sep. 12, 2008, entitled "Composite electromechanical machines with uniform magnets", hereby incorporated by reference.

The present invention relates generally to electromechanical machines, such as motor, generator, dynamo, or alternators, and particularly to composite electromechanical machines.

BACKGROUND

Electromechanical machines such as alternator(s), motor(s), dynamo(s), and generator(s) can convert energy between mechanical energy and electrical energy. For example, an electric motor uses electrical energy to produce mechanical energy, and a generator or dynamo uses mechanical energy to produce electrical energy. In general, an electromechanical machine can operate as a motor or as a generator, depending on the applied input energy. The major differences between a motor and a generator can be in the desired optimization, for example, a motor is designed to optimize speed or torque, and a generator is designed to optimize power generation. Thus the following descriptions are directed to electromechanical machine, which can be equally applied to motors and generator.

The electromechanical machine can convert between mechanical energy and electrical energy through magnetic interaction. From a mechanical point of view, the electromechanical machine comprises a stator which is a stationary part, and a rotor which is a rotating part. For example, a motor converts electrical power to mechanical power in its rotor, through a power supplied to the stator and/or the rotor. From an electrical point of view, the electromechanical machine comprises an armature which is the power-producing component (and which can be either the rotor or the stator), and the field component which is the magnetic field component (and which can also be either the rotor or the stator and can be either an electromagnet or a permanent magnet). The following descriptions use rotor and stator in describing electromechanical machine(s), which can be equally applied to armature(s) and field component(s). In addition, the following descriptions sometimes use the term "magnetic component" or "magnetic plane" of an electromechanical machine to represent either the stator, the rotor, the armature or the field component.

Electrical machines may take the form of DC motors or AC motors with various types such as induction, brushed, brushless, universal, stepper, linear, unipolar, reluctance. However, this classification is not a rigid distinction, especially with advances in electronic control, e.g., moving the commutator out of the motor shell.

There are several ways to supply/generate power to/from an electromechanical machine. In a motor, the supplied power can be from a DC source (DC motor), an AC source (AC motor), or induced in the rotating device (induction motor). AC source can be single-phase or polyphase power systems. For example, two-phase electrical power can have 4 or 3 wires to provide 2 voltage phases, differing by 90 degrees. Three-phase electric power provides 3 voltage phases, differing by 120 degrees. Polyphase power can provide any number of phases, usually three, or a multiple of three.

In addition, motors can incorporate single or double multiphase winding set that is connected to a power supply. For example, doubly-fed electric motors have two independent multiphase windings that actively participate in the energy conversion process, and thus can provide twice the constant torque/speed range as singly-fed electric machines.

SUMMARY OF THE DESCRIPTION

Embodiments of the present invention include an integrated composite electromechanical machine which can operate as a motor, a generator (including, but not limited to, dynamo or alternator), or a combination of motor and generator. The present integrated composite electromechanical machine comprises an integration of a plurality of composite electromechanical machines, with at least one of them comprising a double-sided magnetic plane (e.g., rotor or stator). The present integrated machine also provides various variations of composite electromechanical machine integration, together with a combination of linear, rotating and disk type configurations.

In an aspect, the present composite electromechanical machine comprises at least two rotor/stator pairs integrated together. In an aspect, the two stators from the two rotor/stator pairs form a double-sided stator having an inner stator side and an outer stator side. The composite double-sided stator can replace two separate inner stator and outer stator in coupling with an inner rotor and an outer rotor, respectively. In an aspect, the two rotors from the two rotor/stator pairs form a double-sided rotor having an inner rotor side and an outer rotor side. The composite double-sided rotor can replace two separate inner rotor and outer rotor in coupling with an inner stator and an outer stator, respectively. The stator and the rotors can comprise either a permanent magnet or a winding to generate a magnetic field. If the rotors comprise winding, a brush mechanism can be included to accommodate the winding. The composite electromechanical machine can be a brushless machine with the rotor comprising of at least one permanent magnet, and the double-sided stator comprising stator winding(s). The composite electromechanical machine can be a brush machine with the rotor (inner rotor, outer rotor or both rotors) comprising a winding, and the double-sided stator comprising of at least one permanent magnet.

In an embodiment, the present machine comprises a planar central frame, preferably in the form of a disk, which has two opposite sides. Installed on both sides of the central frame is a plurality of first magnetic field components, which are disposed concentrically along an axis of rotation. The magnetic plane has either a plurality of permanent magnets or windings, which can provide a magnetic field. The magnetic field components are arranged from an innermost magnetic field component to an outermost magnetic field component, disposed concentrically with each other. The innermost magnetic field component can be a cylinder (solid core) or a shell (hollow core). All other magnetic field components are shells, with the inner magnetic components positioned in the core. The magnetic field components disposed on one side of the central frame can be the same or different from the magnetic field components disposed on the other side of the central frame, including the cylinder/shell arrangement, the permanent magnet/winding arrangement, the thickness/material arrangement, etc.

The present machine further comprises two side frames disposed on the opposite side of the central frame with each side frame having a side facing the central frame. Installed on these sides of the side frames is a plurality of second magnetic field components, which are disposed concentrically along the same axis of rotation, and which are interspersed with the first magnetic field components. Similar to the first magnetic field components, the second magnetic field components are arranged from an innermost magnetic field component to an outermost magnetic field component. The innermost magnetic field component can be a cylinder or a shell, but if the corresponding innermost first magnetic field component is a cylinder, the innermost second magnetic field component needs to be a shell. However, if the corresponding innermost first magnetic field component is a shell, the innermost second magnetic field component can be either a cylinder inside this shell, or it can be a shell inside or outside this shell. Also the magnetic field components disposed on one side frame can be the same or can be different from the magnetic field components disposed on the other side frame.

A neighboring first and a second magnetic field component form a rotor/stator pair, and thus the central frame and the side frames support a plurality of rotor/stator pairs, formed by the interspersed first and second magnetic field components. In addition, a first or second magnetic field component disposed between two other magnetic field components is configured to be a double-sided magnetic field component, generating magnetic field at both sides to the two other magnetic field components.

In an embodiment, the two outermost second magnetic field components from the two side frames are connected together and move as one unit. In this case, the outermost second magnetic field components are the outermost magnetic field components, outside of the outermost first magnetic field components. In an embodiment, the outermost first magnetic field components are the outermost magnetic field components, outside of the outermost second magnetic field components. In an embodiment, the outermost second magnetic field components are the outermost magnetic field components, outside of the outermost first magnetic field components, but are not connected and separated by the central frame.

In an embodiment, the present machine further comprises a plurality of additional side frames, disposed parallel and outside the side frames. The side frames and the additional side frames can be magnetic field components, with the intersperse layers forming rotor/stator pairs. The side frames and the additional side frames thus form disk motor, with the magnetic planes being planar, preferably in the shape of a disk. The disk motors are disposed on the outsides of the concentric motor which is formed by the interspersed first and second magnetic planes.

In an embodiment, there is a plurality of central frames parallel to each other with the first magnetic field components disposed on the two outermost sides of the plurality of central frames. In an aspect, the plurality of central frames is magnetic field component, with the intersperse layers forming rotor/stator pairs. The plurality of central frames thus form disk motor, with the magnetic planes being planar, preferably in the shape of a disk. The central disk motors are disposed on the inside of the concentric motor which is formed by the interspersed first and second magnetic planes.

In an embodiment, the present machine comprises a central frame with a plurality of first magnetic field components disposed on one side of the central frame along an axis of rotation. A plurality of second magnetic planes is interspersed with first magnetic planes and disposed concentrically along the same axis of rotation. The first and second magnetic field components form a plurality of rotor/stator pairs. The second magnetic planes also attached to a first side frame in parallel with the central frame. In addition, the present machine further comprises a plurality of side frames disposed in parallel with the first side frame. In an aspect, the side frames are magnetic field components and form rotor/stator pairs in the form of planar disk.

The present composite electromechanical machine further comprises a controller coupled to the rotor/stator pairs to configure at least a winding of the rotor/stator pairs. Configuring a winding can configure or change the functionality or the characteristics of the rotor/stator pairs.

In an embodiment, configuring or changing the functionality of a rotor/stator pair includes making the rotor/stator pair become either a nonoperation part, a motor or a generator. For example, changing the functionality of a rotor/stator pair can include changing a motor configuration to a generator configuration, and vice versa. The controller can change the function of the composite electromechanical machine to accommodate different situations. For example, a composite electromechanical machine can comprise two rotor/stator pairs. For high motor power, the controller can configure the two rotor/stator pairs to be motor, combining their power. For reducing power, the controller can configure one rotor/stator pair to be nonoperation, such as no power or a small power to offset the magnetic braking is supplied to the rotor, the stator, or rotor/stator pair, leaving one rotor/stator pair to carry the load. If the two motor/stator pairs have different power levels, there can be two levels of power outputs, a low power with the stronger rotor/stator pair becoming nonoperation, and a high power with the weaker rotor/stator pair nonoperation. For a faster reduction of power or speed, the controller can configure one rotor/stator pair to be a generator, essentially providing a braking force on the remaining motor. This configuration can conserve energy, storing the braking power of the motor into electrical power of the generator. Similarly, if the two motor/stator pairs have different power levels, there can be two levels of braking power, a higher braking power with the high power rotor/stator pair nonoperation, and a lower braking power with the low power rotor/stator pair nonoperation. Additionally, anyone or a combination thereof can reverse the rotation of the motor for even stronger braking and coming to a complete stop.

In an aspect, the controller can change the characteristics of the rotor/stator pairs, such as changing the wiring or phase wiring of at least a rotor or a stator. Configuring a winding of a rotor/stator pair can comprise changing the phase wiring of the rotor/stator pair, such as configuring a wiring of the rotor/stator pair (only a rotor, only a stator, or both rotor/stator) to different phases. For example, changing phase wiring can configure the windings of a rotor/stator pair to a higher number of phases for high torque and low speed spinning. The number of phases can be one phase, two phases, three phases, or higher. For example, in a three-phase system, three circuit conductors carry three alternating currents (of the same frequency) which reach their instantaneous peak values at different times. Each current is delayed in time by one-third of one cycle of the electrical current.

In an aspect, the controller comprises a switching matrix to configure the windings. In an aspect, the switching matrix is a separate component, coupled to the controller.

Other embodiments can also be included.

DETAILED DESCRIPTION OF THE PREFERRED EMBODIMENTS

Embodiments of the invention include an integrated composite motor or generator which comprises multiple rotor/stator pairs that are configured as a double-sided stator and/or double-sided rotor. The integrated composite electromechanical machine can comprise a plurality of concentric machines or a combination of concentric machines with planar machines.

Figure 1:
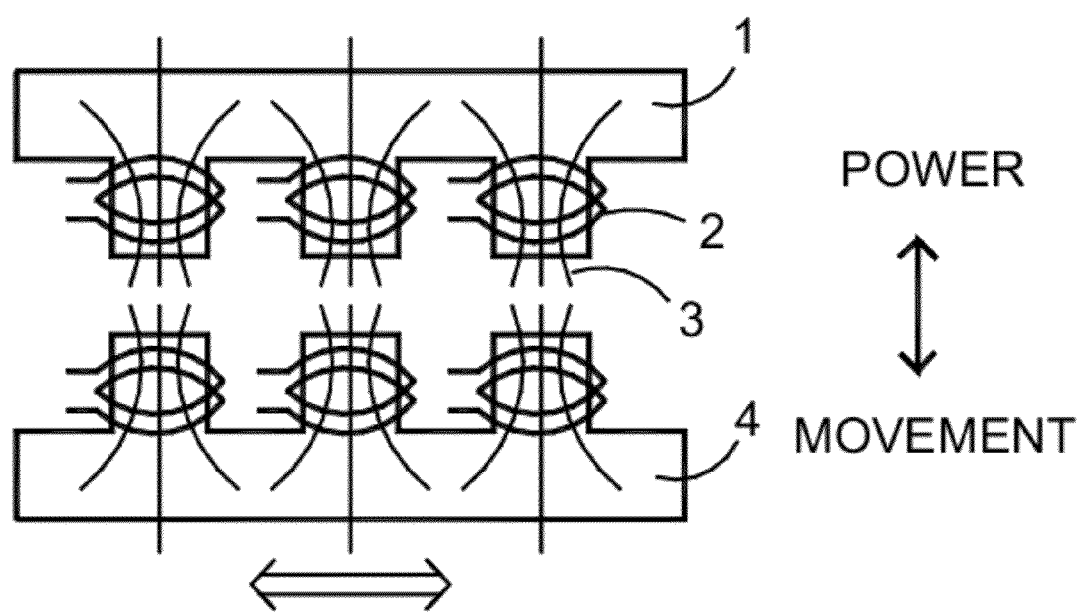
FIG. 1 illustrates an interaction of magnetic field(s) in electromechanical machine.
Figure 2A:
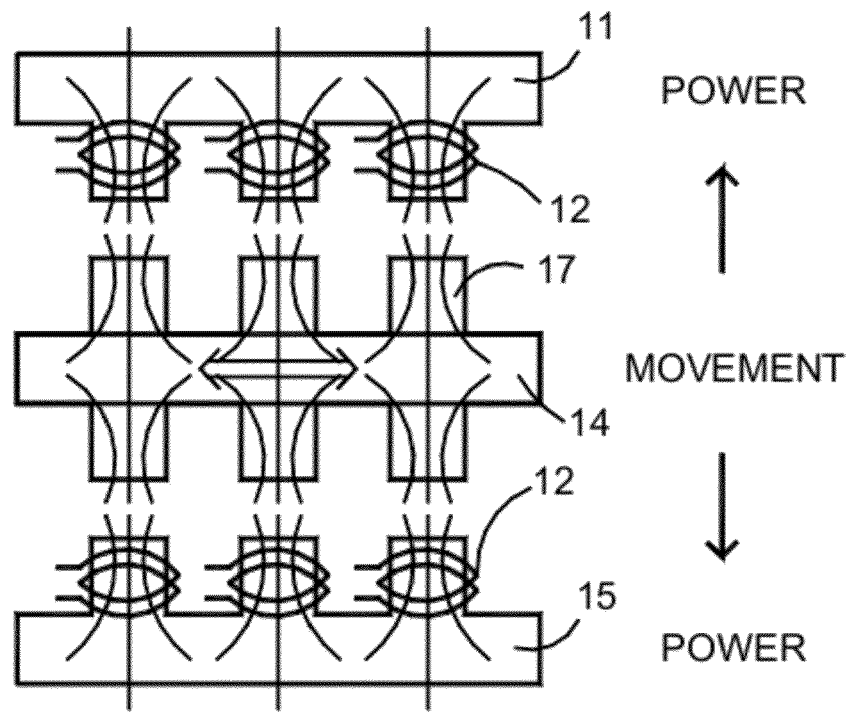
FIGS. 2A-2B illustrate schematic diagrams utilizing a double-sided rotor for generator and motor.

FIG. 1 illustrates the interaction of magnetic field(s) in a motor or generator. A power can be applied to a magnetic plane 1, for example, through the windings 2, to generate a magnetic field 3. Interaction of the magnetic field 3 with another magnetic plane 4 can provide a movement for this magnetic plane 4. Conversely, movement of the magnetic plane 4 can generate power within the windings 2 of the magnetic plane 1. In this configuration, certain magnetic field is directed away from the interaction, and thus does not contribute to the power transfer FIG. 2A illustrates a schematic for a generator using a double-sided rotor, providing a better utilization of the magnetic field. The magnetic plane 14 has magnets 17 (either permanent magnet or electromagnet) generating magnetic field to two other magnetic planes 11 and 15. The magnetic plane 14 in this configuration is a double-sided rotor, and the movement of the magnetic plane 14 generates power in the windings 12 in the stationary magnetic planes 11 and 15. The composite generator includes a pair of stator 11 and rotor 14, together with a pair of stator 15 and rotor 14. The rotor 14 is double-sided, thus acting as two rotors for interacting with two stators 11 and 15.

Figure 2B:
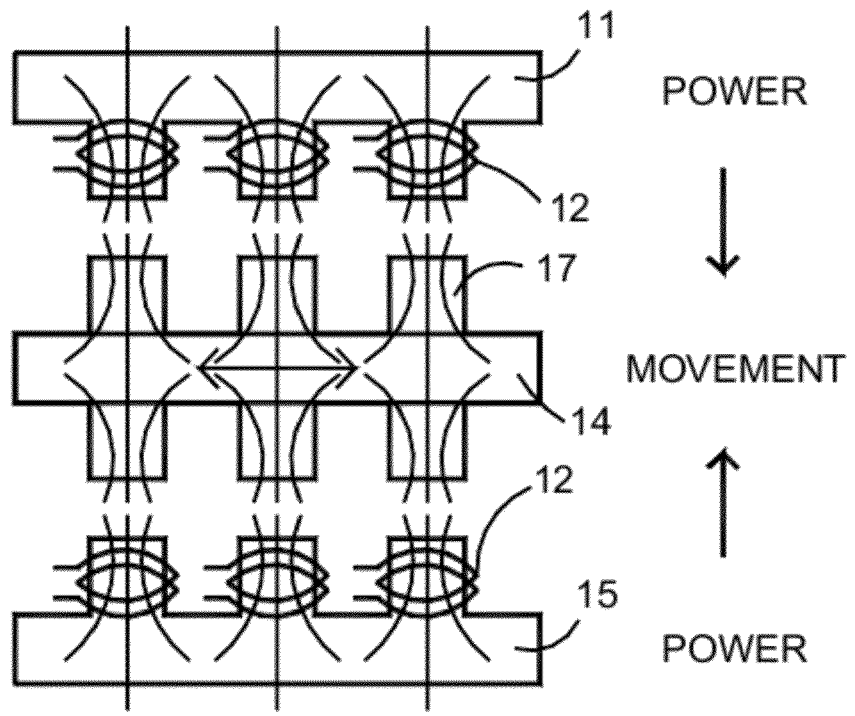

Similarly, FIG. 2B illustrates a motor utilizing a double-sided rotor with the same configuration as that of FIG. 2A. Power applied to the windings 12 of the stationary stators 11 and 15 generates a magnetic field, which interacts with the double-sided rotor 14 to move the rotor 14. In these configurations, a double-sided rotor can provide a composite machine, comprising two individual machines.

Figure 3A:
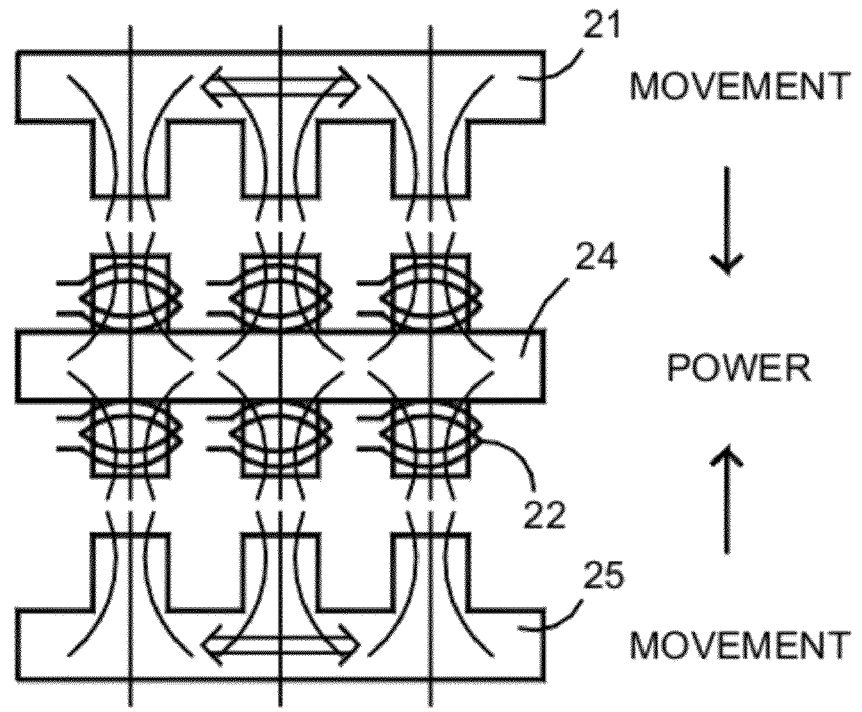
FIGS. 3A-3B illustrate schematic diagrams utilizing a double-sided stator for generator and motor.
Figure 3B:
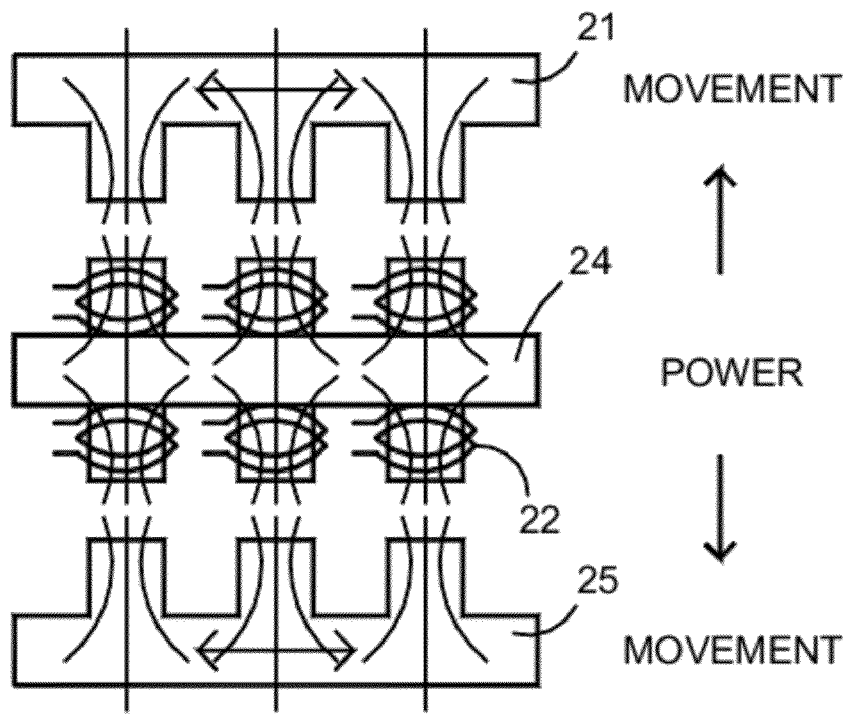

FIGS. 3A and 3B illustrate a schematic for a generator and a motor, respectively, using a double-sided stator 24. The movement of the inner and outer rotors 21 and 25 can generate a magnetic interaction in stator 24, leading to power generation in windings 22 (FIG. 3A). Conversely, power can be applied to the double-sided stator 24 to generate movement in both rotors 21 and 25 (FIG. 3B).

The present invention relates to a composite electromechanical machine employing a double-sided stator/rotor and dual rotors/stators, respectively. The present composite electromechanical machine can possess a variety of functions based on different configurations of the windings arrangements of the stator and rotor pairs, such as high torque density, fast brake, and high efficiency.

In an embodiment, the electromechanical machine preferably includes at least one double-sided stator and at least a rotor having inner and outer working sides. The stator is inserted between the inner and outer working sides of the rotor with air gap(s) between a rotor/stator surface pair, forming a rotor-stator/stator-rotor structure. The stator preferably includes an inner stator side, an outer stator side, generally has a hollow cylindrical shape, with permanent magnet or slotted or non-slotted with winding to form electromagnet. In an aspect, the stator has a winding with a plurality of polyphase windings of electrical wires. The rotor has a generally cylindrical shape which includes an inner rotor component and an outer rotor component. The rotor can also include two separate rotors, an inner rotor and an outer rotor.

In an embodiment, a plurality of permanent magnets is mounted to the working sides of the rotors to form a brushless configuration. Alternatively, windings can be employed on the rotors to form brushed configuration.

Figure 4A:
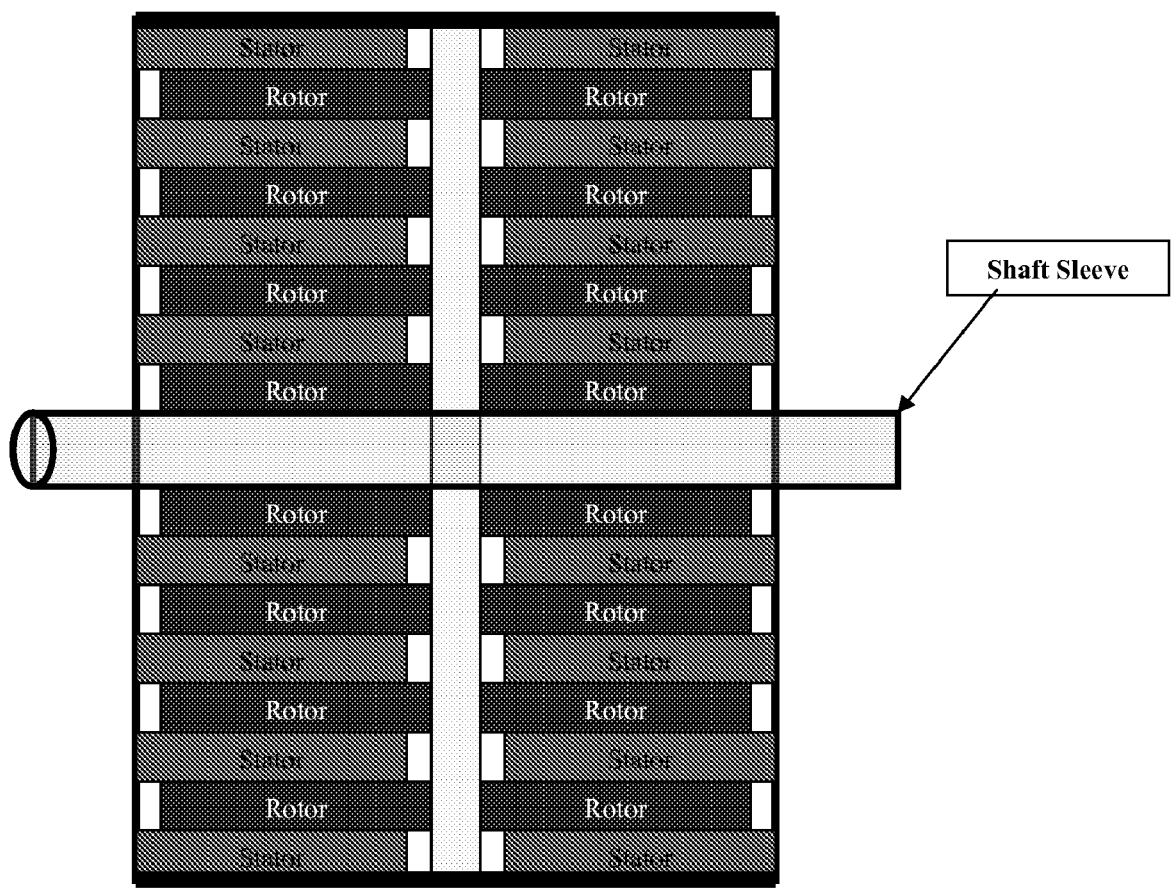
FIGS. 4A-4B illustrate various embodiments of the present electromechanical machine.

FIG. 4A illustrates an exemplary embodiment of the present electromechanical machine, comprising a shaft sleeve connected to a central frame. From the central frame, a plurality of concentric rotors are extruded, and connected to the central frame. A plurality of concentric stators are extruded from two side frames and kept stationary. As shown, the outer shell does not rotate, but the rotational force is exerted through the shaft sleeve. The Central Torque Transmission plate (Rotor Plate) with perpendicular rotating planes affixed to it creates a torque with the outer non-rotating plate's perpendicular planes.

Figure 4B:
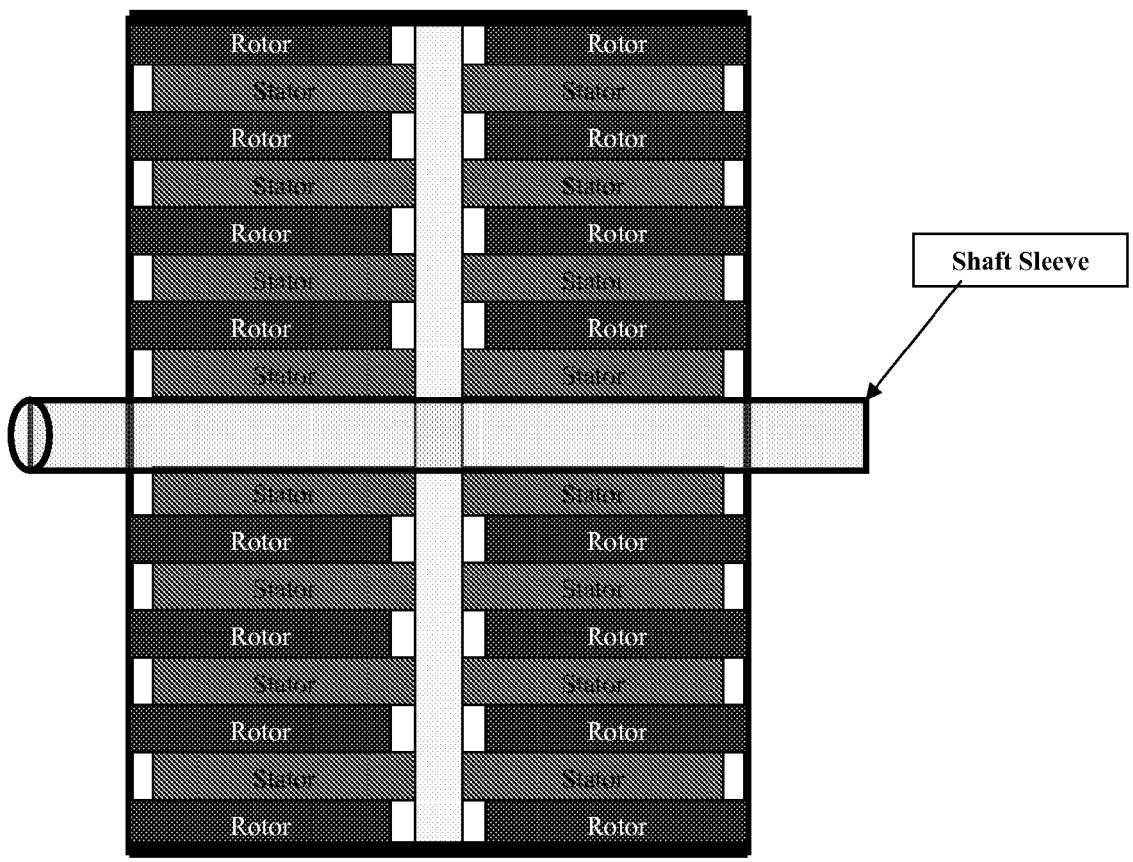

FIG. 4B illustrates another exemplary embodiment where the concentric stators are attached to the central frame, which is connected to the shaft sleeve. A plurality of concentric rotors is attached to the two side frames. In this configuration, the shaft sleeve does not rotate, however the torque transmission is made through the outer shell, which can be constructed of a high friction material, or made to mimic a gear, thereby being a drive. The Central Stationary plate (Stator Plate) with perpendicular rotating planes affixed to it creates a torque with the outer rotating perpendicular planes, affixed to the (outer) Rotor plate, which encloses the motor. The rotor plates can also rotate the shaft sleeve and the stator plate can allow for the shaft sleeve to rotate.

These embodiments extend the double-sided rotor and stator planes, using both sides of the Rotor plate and both sides of the Stator plate. These embodiments can increases the strength and stability, and can provide for even greater customization. By combining the two motors, the power output and the thickness are effectively double, thus afford a greater range of initial manufactured thicknesses.

In addition, the thickness of both sides does not necessarily have to be the same. One side could be thinner than the other side. At the same time, twice as many planes can be individually controlled. Applications of this could include, but not limited to, battery regenerative braking, polarity reversal for greater speed control, additional power boost (similar to a turbo charged engine), etc . . . .

Figure 5A:
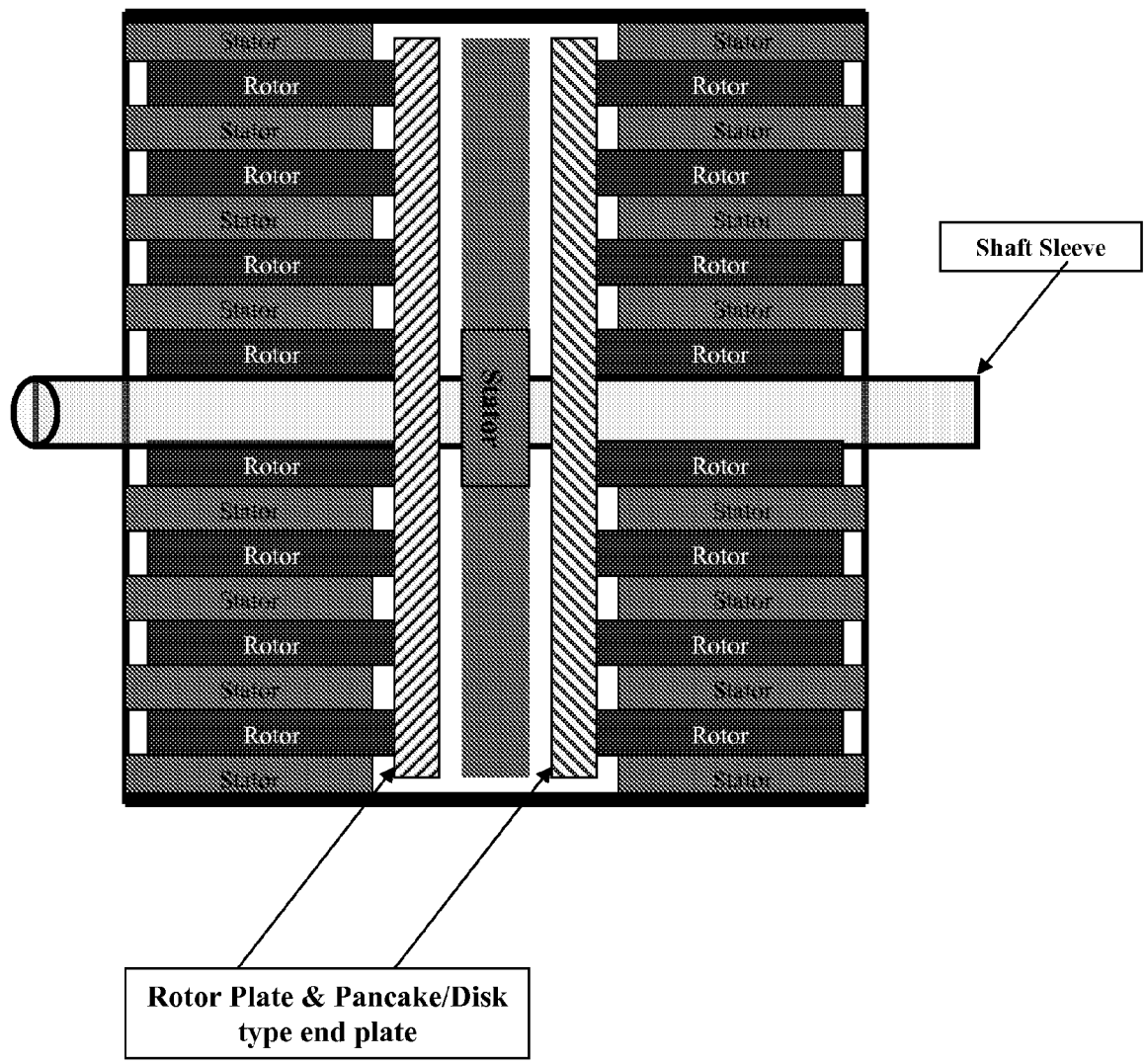
FIGS. 5A-5B illustrate other embodiments of the present electromechanical machine.

FIG. 5A illustrates a variation of the embodiment shown in FIG. 4A, but with a plurality of parallel central frames. The center plate can be separated in two, allowing for the creation of a Pancake/Disk type motor between the two pieces, with the possibility of extra plate(s) between the separated halves of the plate that was split into two pieces. The middle central frame can be a double-sided stator and the two side central frames can be rotors, acting as a Disk/Pancake type machine with two rotor/stator pairs. There can be any number of added central frames to form additional rotor/stator pairs.

Figure 5B:
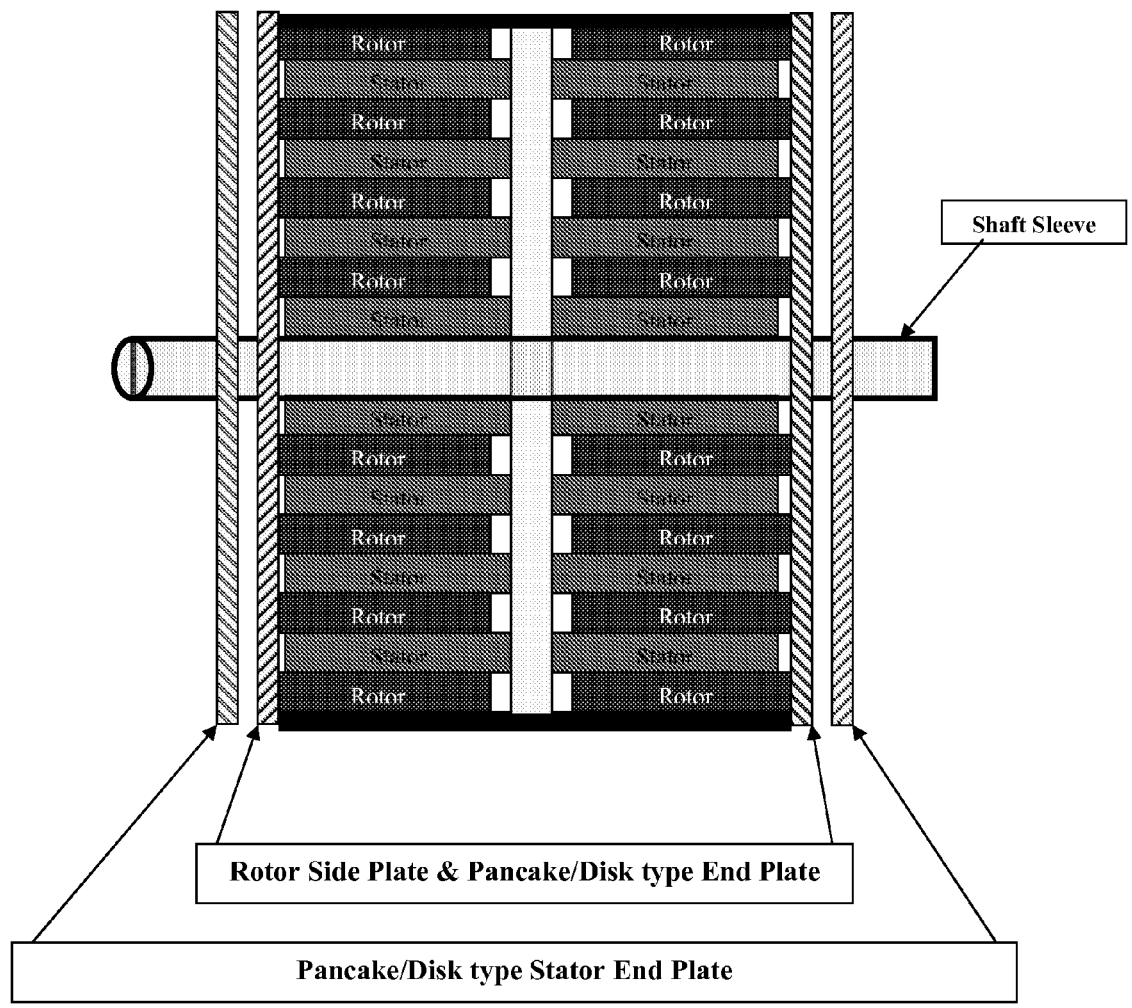

Similarly, FIG. 5B illustrates a variation of the embodiment shown in FIG. 4B, but with a plurality of parallel side frames. The outer Rotor Plates can be made as a combination Rotor Side Plate & Pancake/Disk type End Plates. Additionally, a Pancake/Disk type Stator End Plate can be added to the outer part of the motor, on each side. The two outer side frames can be stators and the two inner side frames can be rotors, acting as a Disk/Pancake type machine with two rotor/stator pairs at two end of the machine. There can be any number of added side frames, and the number of left side frames might be the same or different from the number of right side frames.

Embodiments of the present invention present a novel type electric motor/generator with many unique concepts and configurations, such as the combination of at least two electric machines into one, effectively reducing the amount of needed materials and multiplying the output force by the number of machines combined.

In an embodiment, the machine can be a motor having low-speed high-torque. High-speed design can require a gearing arrangement to reduce the speed and increase the torque output. Low speed high torque motor can eliminate the need for a gearing arrangement, resulting in a significant benefit in cost, material consumption, and overall weight.

An embodiment focuses on the combination of two electric motors (or generators, or any combination of motors and generators). This is accomplished by using both sides of the stator, making a double-sided stator, and/or by using both sides of the rotor, making a double-sided rotor. Each one of these double-sided configurations is constructed to form a single plane (Stator Plane or Rotor Plane).

In an aspect, each type of plane is connected to the appropriate back plates. The stator back plate is held stationary and is the mounting point for the motor. The rotor back plate is connected to the output mechanism. The double-sided stator/rotor can be wound in any feasible manner and the windings can be either separate or combined as one. Alternatively, permanent magnets can be used.

The present electromechanical machine can be constructed with permanent magnets or electromagnets, and it can function as an alternator/generator producing electrical energy. The present machine can generate induced electrical energy through normal operation, for example, additional windings can be included into the design to produce electrical power from normal operation of the motor, without resistance to its normal rotation.

Typically the magnetic planes (rotor or stator planes) are planar or concentric. There can be any number of magnetic planes. Magnetic planes can be cylindrical in shape. Outer planes are hollow cylinder to allow for the insertion of a smaller diameter magnetic planes or the motors main transmission shaft. They are either a representation of a multi-sided/multidirectional stator/rotor, or a multi-sided armature/field. The magnetic planes can have each side wired individually, thereby giving full control of each of the magnetic planes, for whichever function is desired. The magnetic plane can be a multi-sided field/armature/stator/rotor having multiple sides. This plane is constructed on a magnetic plane. Generally, one magnetic plane is located on the outside surface of the double-sided magnetic plane while another one is located on the inside surface of the double-sided magnetic plane. In addition, other magnetic planes can be added at various other locations and directions and orientations.

The permanent magnets are preferably radially magnetized, but may be magnetized using blocked, tapered, parallel, or interleaved methods. In addition, the permanent magnets may be comprised of ferrite magnets or rare earth magnets.

The working surface includes a plurality of inwardly extending teeth to receive polyphase windings of electrical wires wound around the teeth. A plurality of polyphase windings of electrical wires is preferably toroidally-wound around the stator. The windings are preferably wound as back-to-back windings. The stator may be formed by a plurality of stacked laminations that are connected together, or alternatively, may be formed by a magnetic powdered material that is compressed together or some combination thereof. The windings wound around the stator may comprise toroidally-wound windings, lap windings, wave windings, or other types of windings know in the art.

Figure 6A:
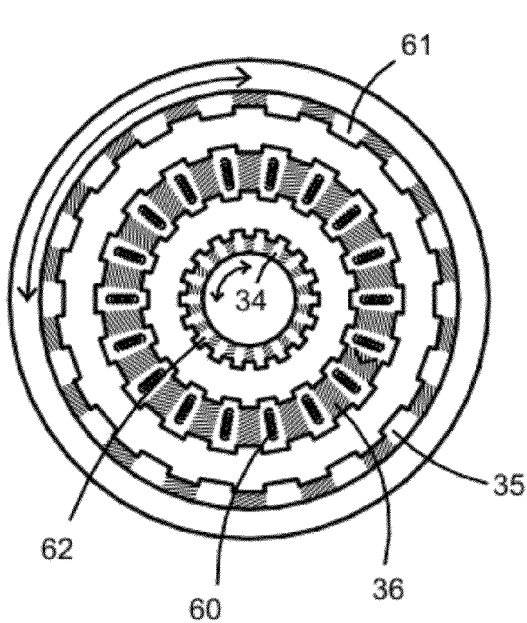
FIGS. 6A-6B illustrate brushless and brushed schematic diagrams with a double-sided stator.
Figure 6B:
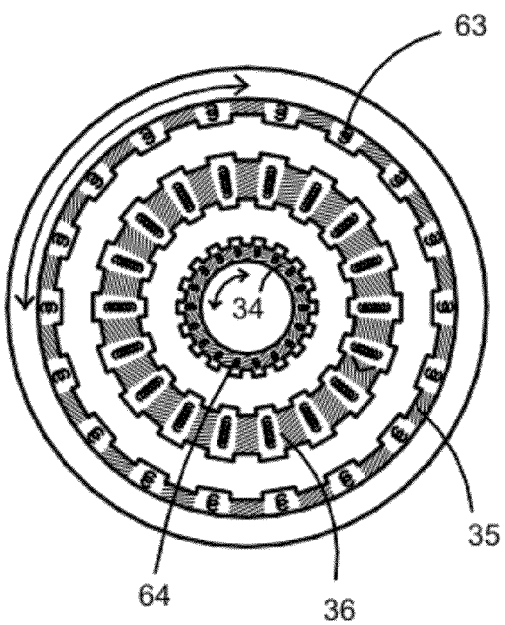

FIGS. 6A-6B illustrate an embodiment of the present machine, with the double-sided stator/rotor 36 comprising a plurality of electromagnet windings 60 for generating magnetic field(s) to an inner rotor/stator 34 and an outer rotor/stator 35. FIG. 6A shows a brushless embodiment where the rotors have permanent magnets 61 and 62. FIG. 6B shows a brushed embodiment where the rotors have electromagnet windings 63 and 64.

Figure 7:
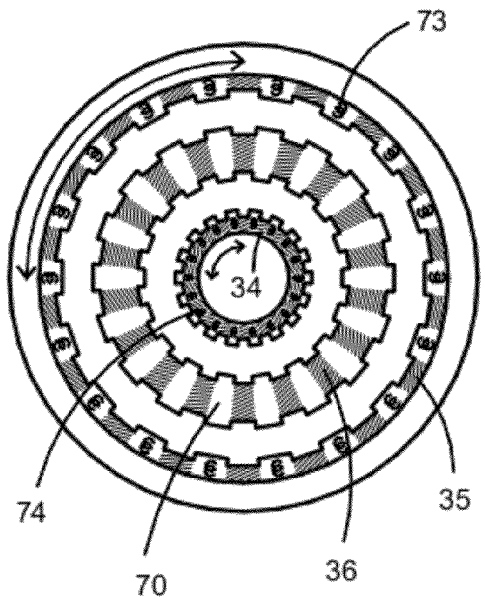
FIG. 7 illustrates a brushed schematic diagram with a double-sided stator.

FIG. 7 illustrates an embodiment of the present machine, with the double-sided stator/rotor 36 comprising a plurality of permanent magnets 70 for generating magnetic field(s) to an inner rotor/stator 34 and an outer rotor/stator 35. FIG. 7 shows a brushed embodiment where the rotors have electromagnet windings 73 and 74.

FIGS. 8A-8F illustrate various configurations for the present electromechanical machine having a double-sided stator (or rotor) and dual inner/outer rotors (or stators) working like two conventional machines, with one machine on the inside and the other machine on the outside.

Figure 8A:
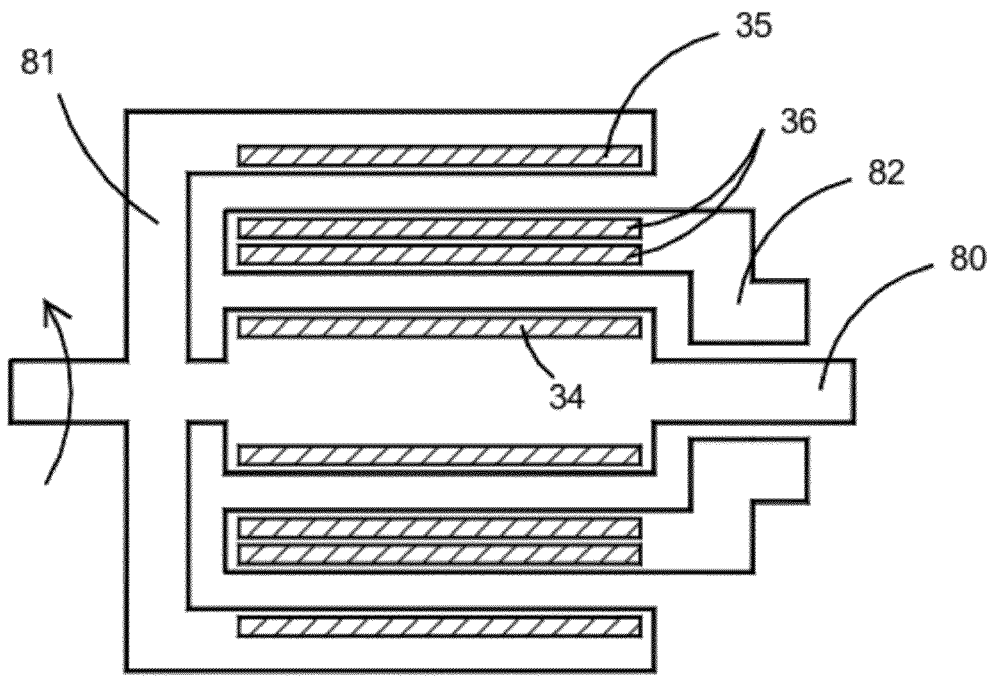
FIGS. 8A-8F illustrate various electromechanical machines according to embodiments of the present invention.

FIG. 8A shows an embodiment of the present machine where the rotors and stators are attached to back plates 81 and 82. As shown, the back plate 81 is rotatable and contains the rotors 34 and 35, and the back plate 82 is stationary (or attached to the rotating axis 80 through a bearing mechanism) and contains the double-sided stator 36. Alternatively, the back plate 81 can be stationary with the rotors 34, 35 become stators, and the back plate 82 is rotatable with the double-sided stator 36 become a double-sided rotor. The magnetic planes (rotors or stators, 34, 35 and 36) can have embedded magnets (permanent or electromagnets) to provide interacting magnetic fields. The magnets in the double-sided magnetic plane can provide substantially similar magnet field as disclosed above. The rotors and the double-sided stator can be coupled through a device that allows free axle rotation, such as a bearing (not shown).

Figure 8B:
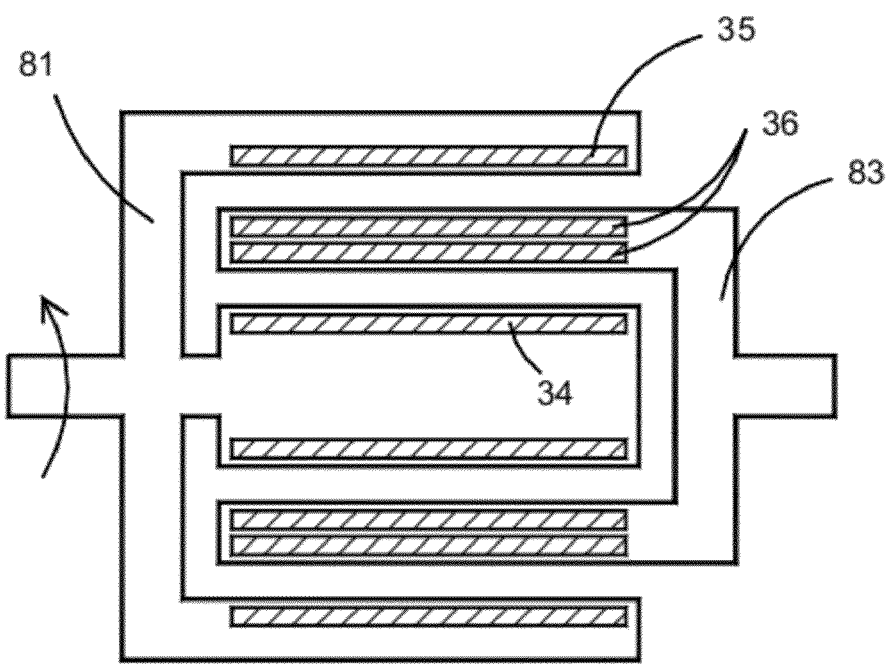

FIG. 8B shows an embodiment of the composite electromechanical machine where the rotors and stators planes are attached to a back plate 81 and 83. As shown, the back plate 81 is rotatable and back plate 83 is stationary, but in another embodiment, back plate 81 can be stationary and back plate 83 is rotatable. Alternatively, both back plates can be rotatable. Inside the electromechanical machine are several layers of magnetic planes, each one following the circumference of the machine at progressively smaller diameters. The magnetic planes can be a short solid or hollow cylinder with closed ends. The magnetic planes are partitioned in two sections, one section is stationary and one section is rotating. Either section can have permanent or electromagnets. If the rotating section contains the electromagnets then a brush assembly is required. If the rotating section contains the permanent magnets then a controlling/timing device is needed, instead of the brushes.

In an aspect, the back plates are constructed of a very high strength metal, plastic or an alloy, in which there is no flexibility, mainly to provide the strength and stability of the machine. These plates can also provide the enclosure. Each of the plates has affixed to them the magnetic planes, either the electromagnet planes or the permanent magnet planes. In an embodiment, between each of these equally spaced magnetic planes is a groove, which can allow the plane affixed to the other back-plate to have a mounting point. Also it can be a slide-bearing race allowing the planes to rotate freely while still providing great strength and stability to the machine, by providing a support on both sides of the planes.

In an aspect, the two back-plates will also be held to each other by a fastener assembly. The rotating back-plate can have a case around it with a bearing race allowing the rotating back-plate to be held in place and still able to move freely in a circular motion. In an embodiment, the back-plate can be slotted to create a fan like action with one side designed for intake and the other designed for exhaust, which provides positive airflow across the internals of the motor providing a cooling effect.

In an aspect, the magnetic plane is a curved rectangular plate, which contains a series of magnets, arranged in latitude, and sequenced in alternating polarity (e.g., positive, negative, positive, negative). These plains will have magnets attached to them in such a way as to allow the magnet to protrude through the plains allowing an equally powerful magnetic force to exert influence both on the in-side and the out-side of the plain. These magnets are strategically located as to provide the maximum amount of torque possible combined with the greatest efficiency. There is always one plane, which is situated above and below each other, except for the layer closet to the shaft, and the outer most layer as well. The electromagnet or group of electromagnets is designed to provide the greatest amount of torque, yet utilizing the least amount of electricity, thus effectively reducing the heat created within the motor, through the current flow.

In an embodiment, the machine can have a shaft or a shaft-sleeve. The concept behind the shaft sleeve is to provide for a stacking feature, where any number of motors can be added or removed, to/from a common shaft. This common shaft accommodates the possibility to combine the output of several electric motors onto one shaft, without the mechanical loss associated with gearing systems. In this configuration, the output force is multiplied by the number of motors on the shaft. An additional benefit of the stacking feature is instead of replacing the motor when the power requirement changes or it fails, just add or remove one or more motors.

The shaft of the machine can be made longer than the body of the motor having the shaft extended from the motor on either end or both depending on its application. This shaft can be used to add additional motors thereby creating a stack of motors. These additionally stacked motors can also function independently all the way down to the individual plane level in each of the separate motors. Alternately, the shaft can be replaced by a sleeve, hollowed and grooved inside, keyed or constructed in such a way allowing for the insertion of a shaft. The shaft can be secured by any feasible method. This can facilitate the stacking of these motors. This common shaft sleeve accommodates the possibility to combine the output of several electric motors onto one shaft, without the mechanical loss associated with gearing systems. For example, the output force is multiplied by the number of motors on the shaft with physical space and shaft strength being the main limitation for this stacking. Further, each motor/generator can be powered on or off as needed.

The composite machine can be configured to combine their power, thus significantly increasing the torque or speed of a motor, or the power generation of a generator.

Figure 8C:
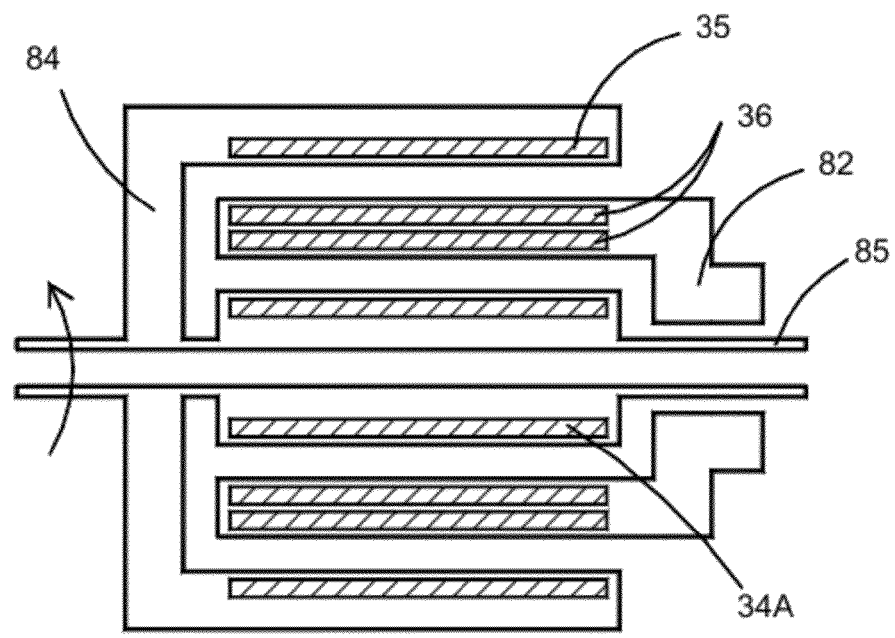

FIG. 8C shows an embodiment incorporating a shaft sleeve 85. The inner rotor 34A is a hollow cylinder to be or to accommodate the shaft sleeve. Alternatively, the inner rotor can be a solid cylinder (not shown) where the shaft sleeve 85 is hollow outside the solid cylinder. The shaft sleeve 85 is connected to a back plate 84 for rotation. Alternatively, the back plate 84 and the shaft sleeve 85 are stationary, and the back plate 82 is rotatable.

In addition, a cooling mechanism can be incorporated for cooling purpose. A fan mechanism at each end of the machine creates positive ventilation, such as a back-plate and a front-plate holding the rotors and stator can be slotted to create a fan-like action/effect. This can be used to provide sufficient airflow across the internals of the motor, providing a cooling effect. For example, a fan at one end is used for intake and slots/openings at the other end are used for exhaust. Any type of aspiration method can be used, as long as it can supply sufficient air intake for purposes of transferring heat. In addition, heat transfer for the machine can be increased and improved by the addition of highly conductive material(s) for thermal management. An attachment or method to hold a filtering device can be incorporated on all ends, or a permanent filter can be used.

Figure 8D:
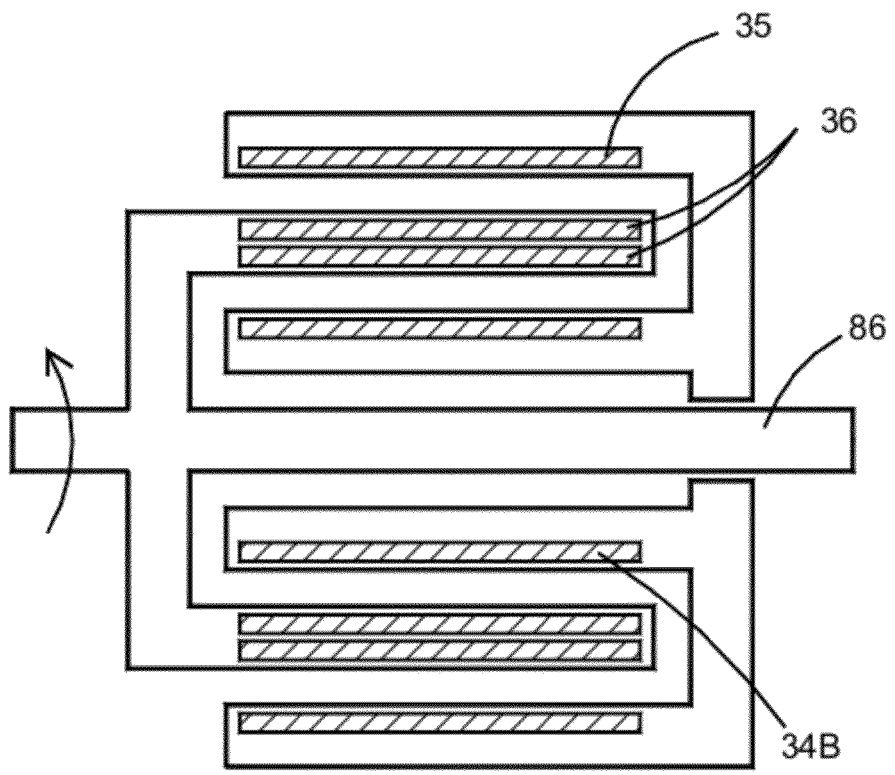

FIG. 8D shows an embodiment where the innermost stator 34B is a hollow cylinder, with a shaft 86 (or a shaft sleeve, not shown) passing through.

Figure 8E:
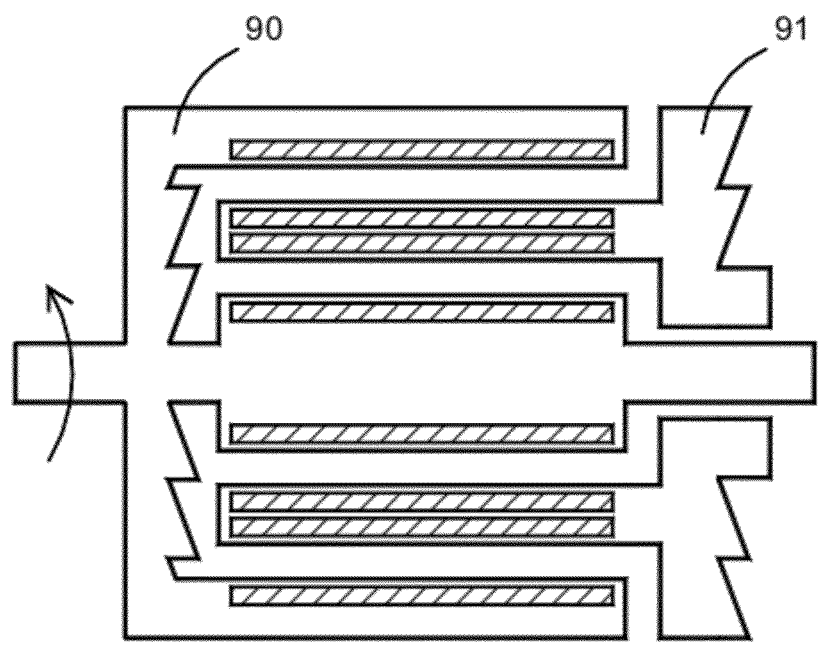

FIG. 8E shows an embodiment incorporating a fan mechanism at the ends of the rotor/stator pairs. Two fan-like blades 90 and 91 can be slotted to create an air flow across the rotors and stator for cooling purpose. The configuration shows a schematic of the fan tabs, but in general, the fan tabs can be facing any directions, for example, the fan tabs could go through the side plates.

Figure 8F:
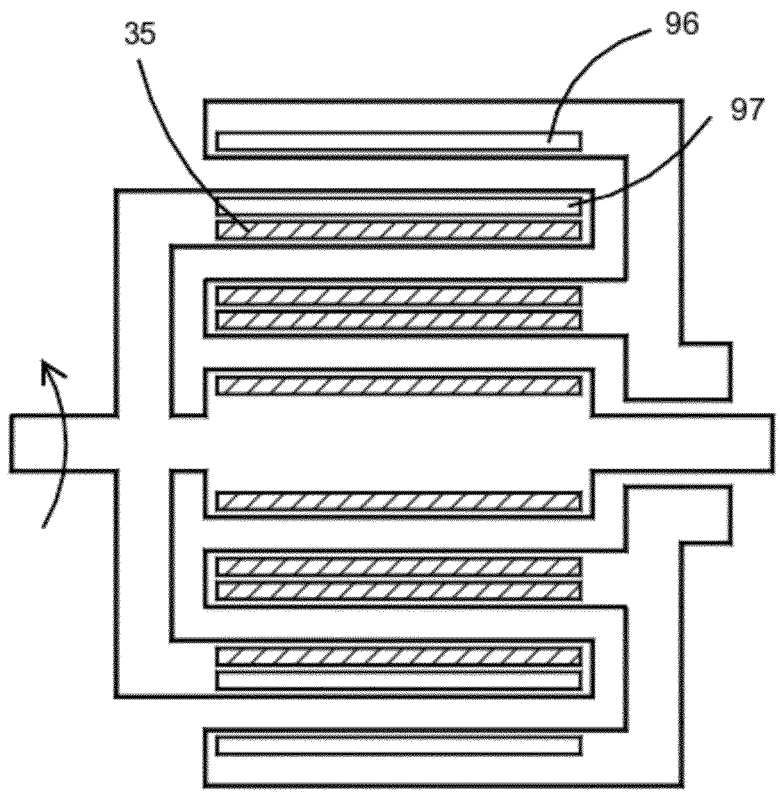

FIG. 8F shows an embodiment incorporating an additional rotor/stator pair. The outer rotor 35 is converted to a double-sided rotor 97 and an additional outer stator 96 is added. The incorporation of the addition rotor/stator pair can further enhance the power of the machine.

Figure 9A:
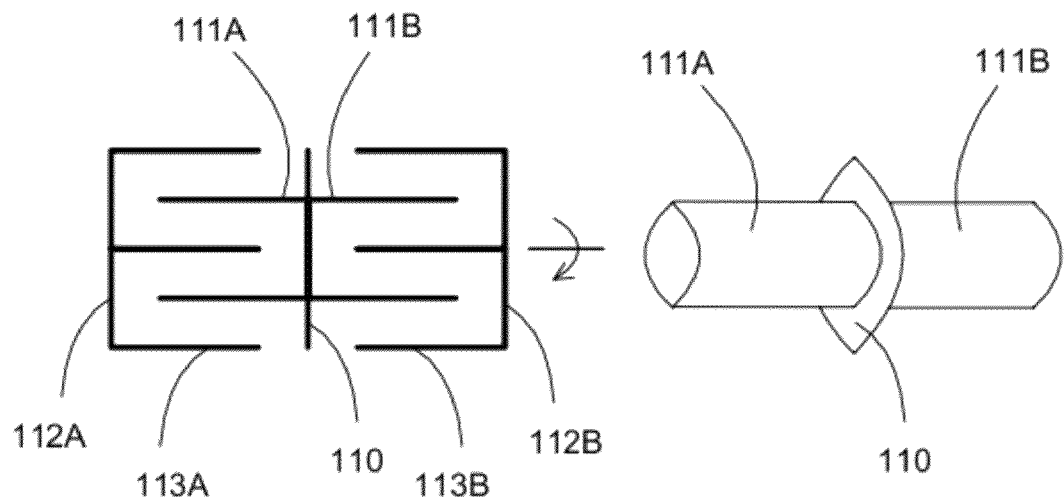
FIGS. 9A-9C, 10A-10B, 11A-11B, 12A-12B, 13A-13B, and 14A-14C illustrate various embodiments of the present electromechanical machine.

FIG. 9A illustrates an embodiment of the present machine with the two outermost magnetic components are the second magnetic components 113A and 113B attached to the side frames 112A and 112B. The two outermost magnetic components 113A and 113B are separated by the central frame 110 having a plurality of first magnetic components 111A and 111B attached to both sides of this central frame 110. The magnetic components are concentric along an axis of rotation. The frames are planar and preferably have a disk shape.

Figure 9B:
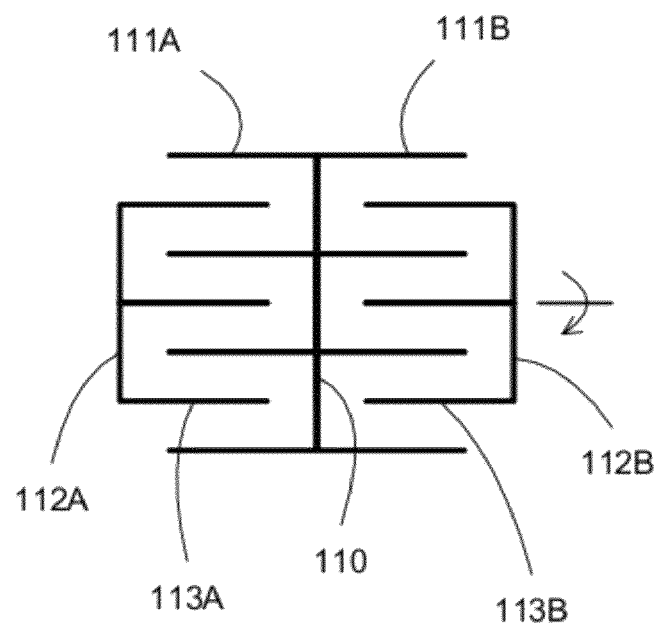
Figure 9C:
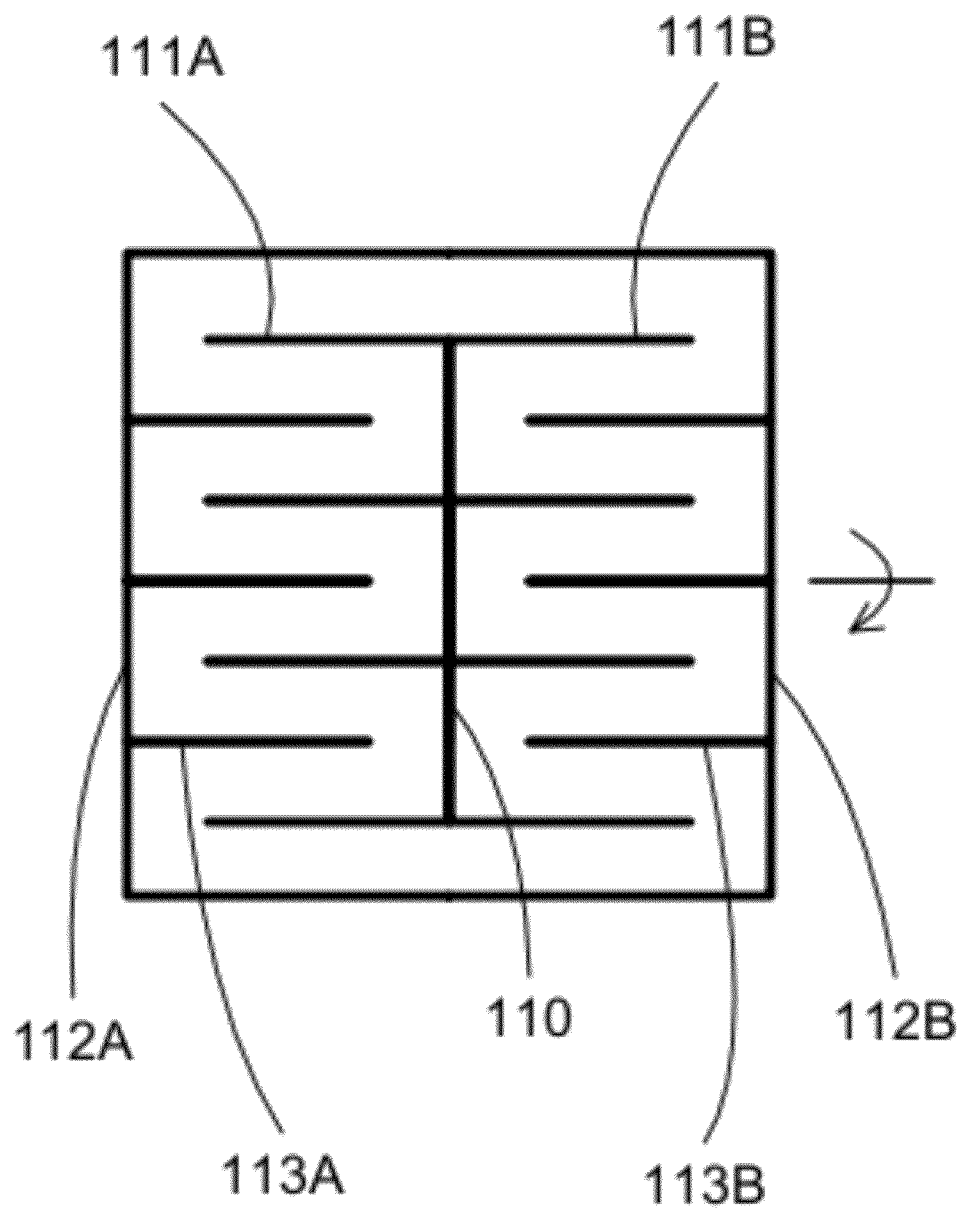

FIG. 9B illustrates an embodiment of the present machine with the two outermost magnetic components are the first magnetic components 111A and 111B attached to the central frame 110. FIG. 9C illustrates an embodiment of the present machine with the two outermost magnetic components are the second magnetic components 113A and 113B attached to the side frames 112A and 112B, and connected together.

As shown, the first and second magnetic components are either rotor or stator, depending on the configuration. In FIGS. 9A and 9B, the two side frames can be disconnected, and thus can act independently. For example, the central frame 110 can be stationary (and thus the magnetic field components 111A and 111B are stators), and the two side frames 112A and 112B can rotate (and thus the magnetic field components 113A and 113B are rotors). Since the two side frames 112A and 112B are independent, these two side frames can rotate at different speed. Alternatively, one side frame, for example, side frame 112A, can be stationary (and thus the magnetic field components 113A are stators). The central frame 110 can rotate (and thus the magnetic field components 111A and 111B are rotors). The other side frame, for example 112B, can be stationary, or can rotate at a different speed than the central frame. Thus in a sense, a rotor/stator pair implies a different movement speed between the rotor and the stator, e.g., the rotor component moves faster than the stator component. A stator is not necessarily stationary according to embodiments of the present invention. In FIG. 9C, the two outermost magnetic components are connected together, and thus the two pairs of double-sided magnetic planes move as one.

Figure 10A:
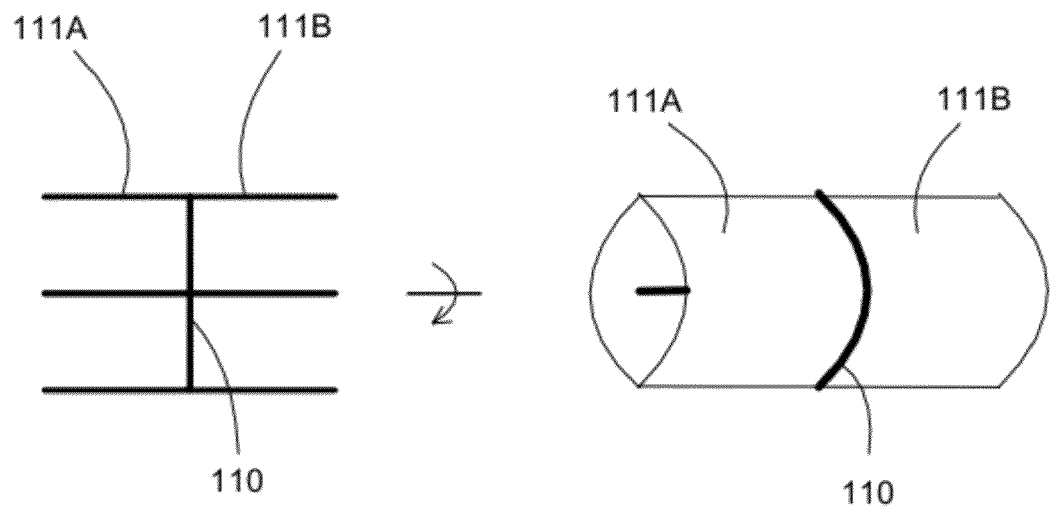
Figure 10B:
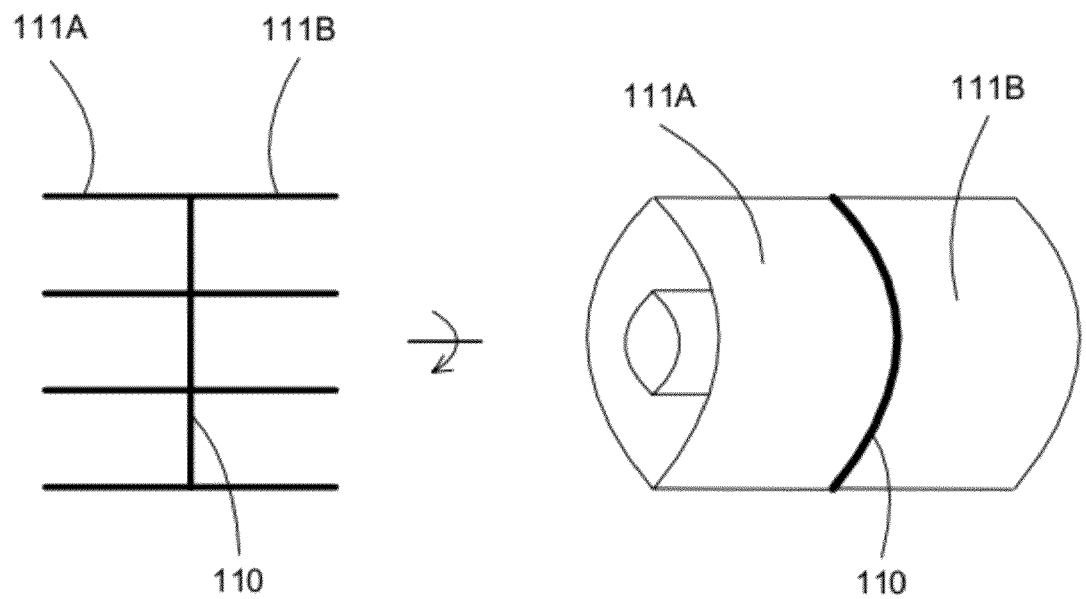

FIG. 10A illustrates an exemplary central frame 110 together with the magnetic field components 111A and 111B disposed on both sides of the central frame 110. In this configuration, the inner magnetic field component is a cylinder, and the outer magnetic field component is a shell, e.g., hollow cylinder. FIG. 10B illustrates another exemplary central frame 110 with the magnetic field components 111A and 111B. In this configuration, both inner and outer magnetic field components are shells.

Figure 11A:
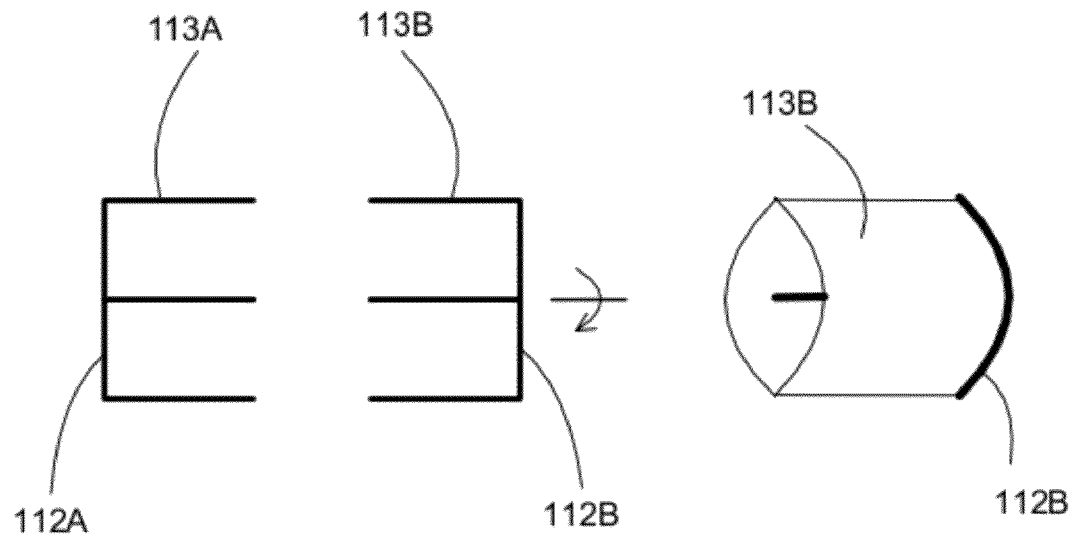
Figure 11B:
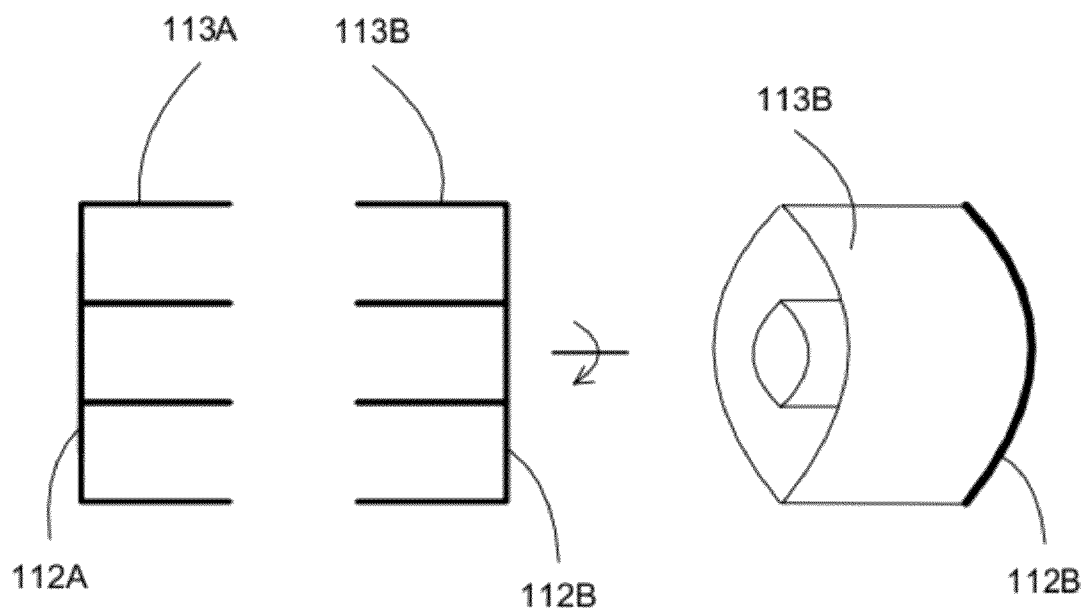

FIG. 11A illustrates an exemplary embodiment of side frames 112A and 112B together with the magnetic field components 113A and 113B disposed on the sides of the side frames 112A and 112B. In this configuration, the inner magnetic field component is a cylinder, and the outer magnetic field component is a shell. FIG. 11B illustrates another exemplary embodiment of side frames 112A and 112B with the magnetic field components 113A and 113B. In this configuration, both inner and outer magnetic field components are shells.

Figure 12A:
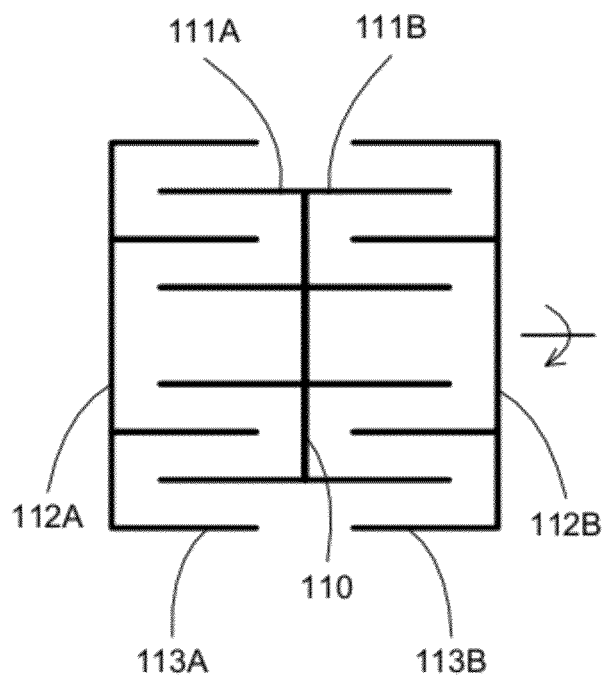
Figure 12B:
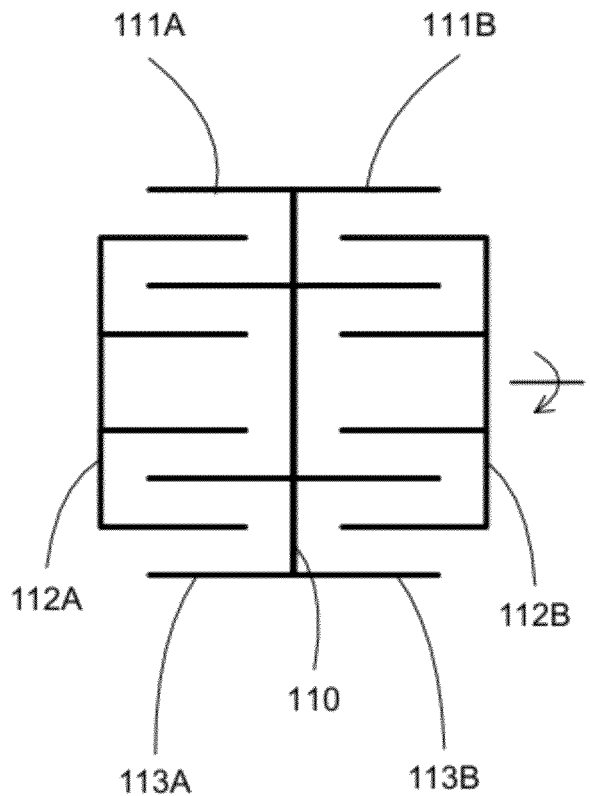

FIGS. 12A and 12B illustrates two exemplary embodiments where the innermost magnetic field components are all shells. In FIG. 12A, the magnetic field components 111A and 111B disposed on the central frame 110 are the innermost magnetic field components. In FIG. 12B, the magnetic field components 113A and 113B disposed on the side frames 112A and 112B are the innermost magnetic field components.

Figure 13A:
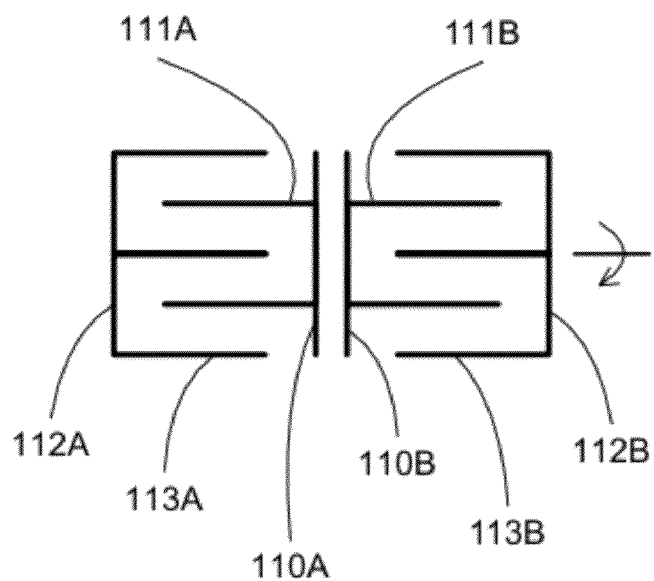

FIG. 13A illustrates an embodiment where the central frame is split into two central frames 110A and 110B. If the two central frames 110A and 110B are magnetic field components, a rotor/stator pair can be established, providing added power output to the machine. Further, the left machine can be decoupled from the right machine, allowing additional degree of freedom. For example, the left portion can rotate at a different speed than the right portion. Or the left side frame 112A can be stationary, the left central frame 110A can rotate at a low speed, the right central frame 110B can rotate at a higher speed, and the right side frame 112B can rotate at a highest speed. Other rotation configurations can be possible, allowing different characteristics and performance for the present machine.

Figure 13B:
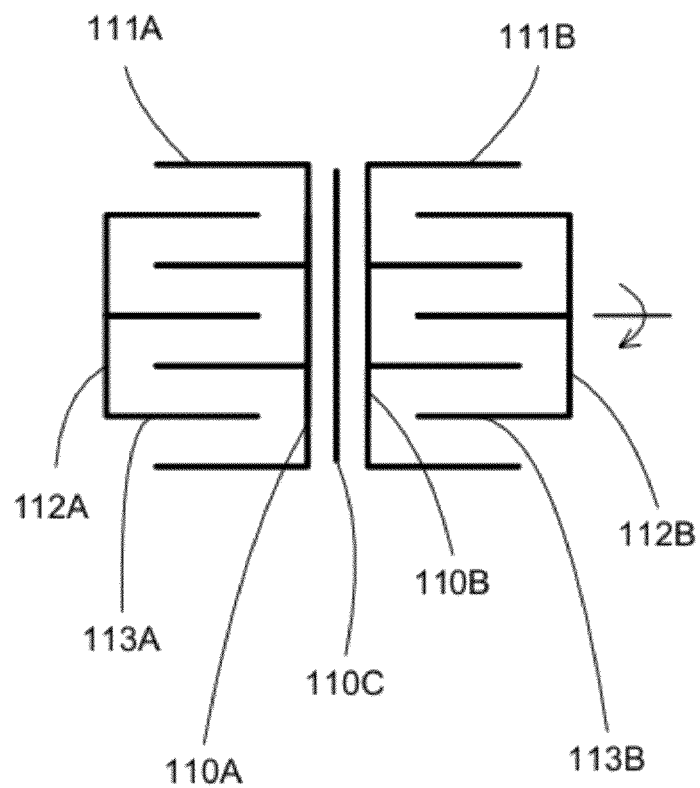

FIG. 13B illustrates another embodiment where there is an additional central 110C between the split central frames 110A and 110B. More power and configurations can be provided with this embodiment.

Figure 14A:
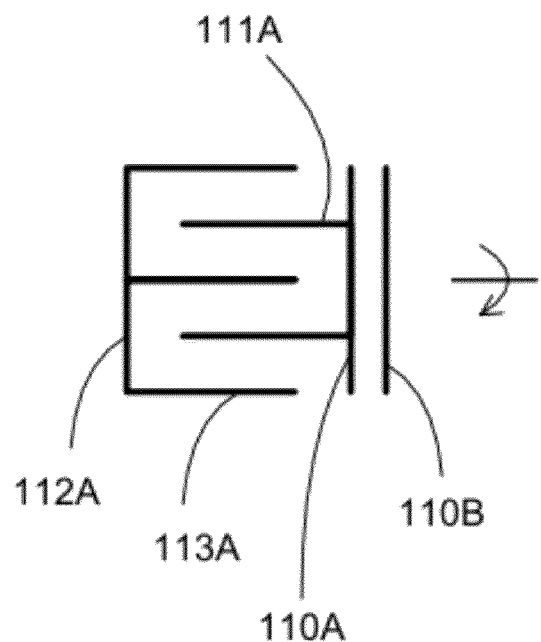
Figure 14B:
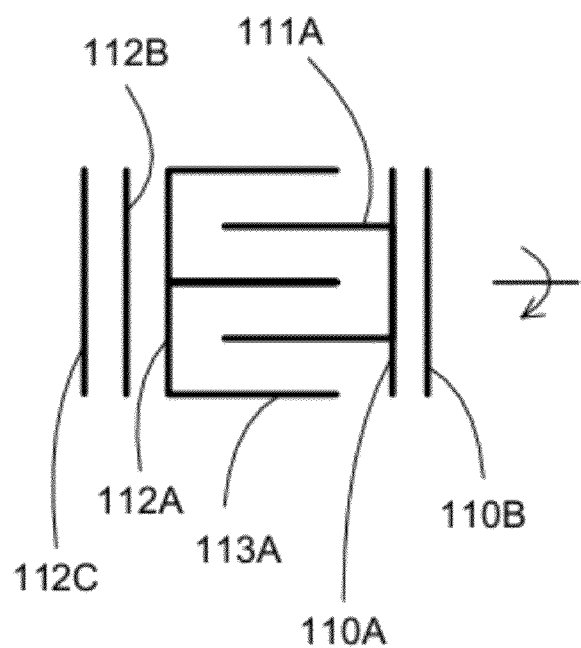
Figure 14C:
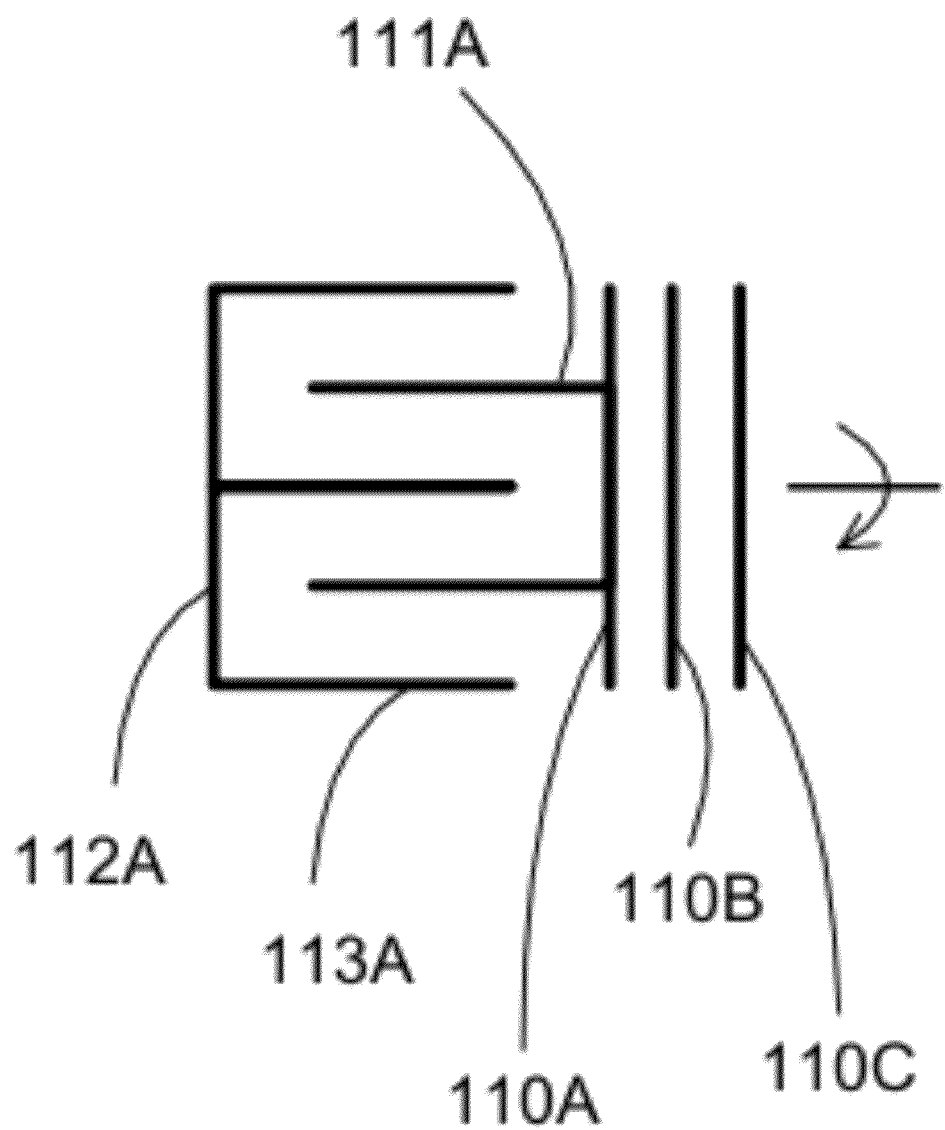

FIG. 14A illustrates an embodiment where there is only one side frame 112A together with a plurality of central frames 110A and 110B. Additional side frames 112B and 112C can be added next to the side frame 112A (FIG. 14B), and additional central frame 110C can be added next to the central frames 110A and 110B (FIG. 14C). The present invention is not limited to the illustrated configurations. Other configurations can be employed, depending on the desired objectives.

In an embodiment, the present machine further comprises a controller, coupled to the composite electromechanical machine and is capable of configuring the composite electromechanical machine. For example, the controller can configure the functionality of the various rotor/stator pairs of the composite electromechanical machine to be nonoperation, motors, generators or any combination thereof. The controller can configure the characteristics of the various rotor/stator pairs of the composite electromechanical machine such as the phase windings to so that a motor can have different speed or torque, or a generator can have different output phases. In an aspect, the controller is connected to the wirings of the rotors and stators, and thus can change or configure at least a wiring of the rotor or stator.

In an embodiment, the controller can configure (or change) any number of rotor/stator pairs. For example, for a composite machine (e.g., motor or generator) having 2 rotor/stator pairs, the controller can turn one rotor/stator pair into a nonoperation machine to reduce the power output. The controller can also turn a rotor/stator pair into a generator to generate a braking action for motor for re-using braking energy.

In an embodiment, the controller can include a wiring matrix such as a switching matrix connected to the composite electromechanical machine, preferably through the wiring or electrical windings of a rotor or stator. The wiring matrix can be a part of the machine, and the controller can be connected to the wiring matrix. In an aspect, sub-controllers can be connected to the machine, and the controller can configure the machines through the sub-controllers. Wiring matrices can be incorporated in the machines, or in the sub-controllers.

While the invention has been described with reference to preferred embodiments, it is to be understood that the invention is not intended to be limited to the specific embodiments set forth above. For example, the magnetic component can be a planar magnetic component, or the electromechanical machine can be a linear motor.

What is claimed is:

1. An electromechanical machine having an axis of rotation, comprising
    two or more parallel central frames having two outermost sides and one or more pairs of first facing inner sides, wherein each pair of first facing inner sides comprises two oppositely first facing sides of two adjacent central frames;
    a plurality of first planar magnetic field layers, wherein each first planar magnetic field layer comprises a plurality of magnetic field components disposed in a planar surface, wherein each oppositely first facing side comprises a first planar magnetic field layer, wherein first planar magnetic layers of two oppositely first facing sides of two adjacent central frames form a planar rotor/stator pair;
    a plurality of first magnetic field components radially disposed on each of the two outermost sides of the central frame and concentrically along the axis of rotation, each first magnetic field component disposed in a concentric cylindrical formation with north-south poles oriented radially through the axis of rotation;
    two first side frames, each first side frame having one side facing an outermost side of the central frame; and
    a plurality of second magnetic field components radially disposed on the sides of the first side frames, concentrically along the axis of rotation, and interspersed with the first magnetic field components, each second magnetic field component disposed in a concentric cylindrical formation with north-south poles oriented radially through the axis of rotation,
    wherein a first and a second magnetic field components form a rotor/stator pair facing each other from different concentric circles.

2. An electromechanical machine as in claim 1 wherein there are three parallel central frames having two pairs of first facing inner sides and forming two planar rotor/stator pairs disposed inside the two outermost sides of the parallel central frames.

3. An electromechanical machine as in claim 1 further comprising
- one or more second side frames disposed in parallel with at least one of the two first side frames, wherein the one or more second side frames and the at least one of the two first side frames comprise one or more pairs of second facing inner sides, wherein each pair of second facing inner sides comprises two oppositely second facing sides of two adjacent side frames;
- a plurality of second planar magnetic field layers, wherein each second planar magnetic field layer comprises a plurality of magnetic field components disposed in a planar surface, wherein each oppositely second facing side comprises a second planar magnetic field layer, wherein second planar magnetic layers of two oppositely second facing sides of two adjacent side frames form a planar rotor/stator pair.

4. An electromechanical machine having an axis of rotation, comprising
- a central frame having two sides;
- a plurality of first double-sided magnetic field components radially disposed on each of the two sides of the central frame and concentrically along the axis of rotation, each first double-sided magnetic field component disposed in a concentric cylindrical formation with north-south poles oriented radially through the axis of rotation;
- two first side frames, each first side frame having one side facing a side of the central frame; and
- a plurality of second magnetic field components radially disposed on the side of the first side frame, concentrically along the axis of rotation, and interspersed with the first magnetic field components, each second magnetic field component disposed in a concentric cylindrical formation with north-south poles oriented radially through the axis of rotation,
- wherein a first field component is sandwiched between two second magnetic field components to form two rotor/stator pairs facing each other from different concentric circles;
- one or more second side frames disposed in parallel with at least one of the two first side frames, wherein the one or more second side frames and the at least one of the two first side frames comprise one or more pairs of second facing inner sides, wherein each pair of second facing inner sides comprises two oppositely second facing sides of two adjacent side frames;
- a plurality of second planar magnetic field layers, wherein each second planar magnetic field layer comprises a plurality of magnetic field components disposed in a planar surface, wherein each oppositely second facing side comprises a second planar magnetic field layer, wherein second planar magnetic layers of two oppositely second facing sides of two adjacent side frames form a planar rotor/stator pair.

5. An electromechanical machine as in claim 4 wherein the two outermost second magnetic field components of the two first side frames are connected together outside of the outermost first magnetic field components.

6. An electromechanical machine as in claim 4 wherein the two outermost second magnetic field components of the two first side frames are separated by the central frame, and are outside of the outermost first magnetic field components.

7. An electromechanical machine as in claim 4 wherein the two outermost first magnetic field components of the two outermost sides of the plurality of the central frames are outside of the outermost second magnetic field components.

8. An electromechanical machine as in claim 4 wherein an innermost first magnetic field component is one of cylinders and shells.

9. An electromechanical machine as in claim 4 wherein an innermost second magnetic field component is one of cylinders and shells.

10. An electromechanical machine as in claim 4 further comprising
- one or more third side frames disposed in parallel with the other first side frame, wherein the one or more third side frames and the other first side frame comprise one or more pairs of third facing inner sides, wherein each pair of third facing inner sides comprises two oppositely third facing sides of two adjacent side frames;
- a plurality of third planar magnetic field layers, wherein each third planar magnetic field layer comprises a plurality of magnetic field components disposed in a planar surface, wherein each oppositely third facing side comprises a third planar magnetic field layer, wherein third planar magnetic layers of two oppositely third facing sides of two adjacent side frames form a planar rotor/stator pair.

11. An electromechanical machine as in claim 4 further comprising:
- a controller coupled to the magnetic field components to configure at least a winding of the magnetic field components.

12. An electromechanical machine as in claim 11 wherein the controller configures a magnetic field component to be one of a motor, a generator, and nonoperation.

13. An electromechanical machine as in claim 11 wherein the controller configures the windings of a magnetic field component to different phases.

14. An electromechanical machine having an axis of rotation, comprising
- a first central frame having a first side and a second side;
- a plurality of first magnetic field components radially disposed on the first side of the first central frame and concentrically along the axis of rotation, each first magnetic field component disposed in a concentric cylindrical formation with north-south poles oriented radially through the axis of rotation;
- a first side frame having one side facing the first side of the first central frame;
- a plurality of second magnetic field components radially disposed on the side of the first side frame, concentrically along the axis of rotation, and interspersed with the first magnetic field components, each second magnetic field component disposed in a concentric cylindrical formation with north-south poles oriented radially through the axis of rotation; and
- a second central frame having a third side disposed in parallel with the second side of the first central frame;
- a plurality of third magnetic field components planarly disposed on the second side of the first central frame;
- a plurality of fourth magnetic field components planarly disposed on the third side of the second central frame;
- wherein the third and the fourth magnetic field components form a planar rotor/stator pair facing each other;
- wherein a first and a second magnetic field components form a rotor/stator pair facing each other from different concentric circles.

15. An electromechanical machine as in claim 14 wherein the second central frame having a fourth side opposite the third side, the machine further comprising
- a plurality of third magnetic field components radially disposed on the fourth side of the second central frame and concentrically along the axis of rotation, each first magnetic field component disposed in a concentric cylindrical formation with north-south poles oriented radially through the axis of rotation;
- a second side frame having one side facing the fourth side of the second central frame;
- a plurality of fourth magnetic field components radially disposed on the side of the second side frame, concentrically along the axis of rotation, and interspersed with the third magnetic field components, each fourth magnetic field component disposed in a concentric cylindrical formation with north-south poles oriented radially through the axis of rotation; and
- wherein a third and a fourth magnetic field components form a rotor/stator pair facing each other from different concentric circles.

16. An electromechanical machine as in claim 14 further comprising
- one or more third side frames disposed in parallel with the first side frame, wherein the one or more third side frames and the first side frame comprise one or more pairs of third facing inner sides, wherein each pair of third facing inner sides comprises two oppositely third facing sides of two adjacent side frames;
- a plurality of third planar magnetic field layers, wherein each third planar magnetic field layer comprises a plurality of magnetic field components disposed in a planar surface, wherein each oppositely third facing side comprises a third planar magnetic field layer, wherein third planar magnetic layers of two oppositely third facing sides of two adjacent side frames form a planar rotor/stator pair.

17. An electromechanical machine as in claim 14 further comprising
- one or more third central frames disposed in parallel with the second central frame, wherein the one or more third central frames and the second central frame comprise one or more pairs of third facing inner sides, wherein each pair of third facing inner sides comprises two oppositely third facing sides of two adjacent side frames;
- a plurality of third planar magnetic field layers, wherein each third planar magnetic field layer comprises a plurality of magnetic field components disposed in a planar surface, wherein each oppositely third facing side comprises a third planar magnetic field layer, wherein third planar magnetic layers of two oppositely third facing sides of two adjacent side frames form a planar rotor/stator pair.

18. An electromechanical machine as in claim 14 further comprising:
- a controller coupled to the magnetic field components to configure at least a winding of the magnetic field components.

19. An electromechanical machine as in claim 18 wherein the controller configures a magnetic field component to be one of a motor, a generator, and nonoperation.

20. An electromechanical machine as in claim 18 wherein the controller configures the windings of a magnetic field component to different phases.

* * * * *